United States Patent
Szor et al.

(10) Patent No.: US 7,665,123 B1
(45) Date of Patent: Feb. 16, 2010

(54) METHOD AND APPARATUS FOR DETECTING HIDDEN ROOTKITS

(75) Inventors: Peter Szor, Northridge, CA (US); Mark Kennedy, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 823 days.

(21) Appl. No.: 11/292,687

(22) Filed: Dec. 1, 2005

(51) Int. Cl.
G06F 12/14 (2006.01)
G06F 11/00 (2006.01)

(52) U.S. Cl. .............. 726/2; 726/22; 726/23; 726/24; 726/25; 726/30; 713/188

(58) Field of Classification Search .......... 726/2
See application file for complete search history.

(56) References Cited

U.S. PATENT DOCUMENTS

| | | | |
|---|---|---|---|
| 6,931,503 B1 * | 8/2005 | Robb et al. | 711/163 |
| 6,968,461 B1 * | 11/2005 | Lucas et al. | 726/22 |
| 2003/0120952 A1 * | 6/2003 | Tarbotton et al. | 713/201 |

OTHER PUBLICATIONS

Wang, Yi-Min, et al, 'Detecting Stealth Software with Strider GhostBuster', Microsoft Corporation, Feb. 21, 2005, entire document, http://research.microsoft.com/pubs/70147/tr-2005-25.pdf.*
Rutkowska, J., 'Thoughts about Cross-View based Rootkit Detection', Jun. 2005, entire document, http://www.invisiblethings.org/papers/crossview_detection_thoughts.pdf.*

* cited by examiner

*Primary Examiner*—Kambiz Zand
*Assistant Examiner*—Ronald Baum
(74) *Attorney, Agent, or Firm*—Gunnison, McKay & Hodgson, L.L.P.; Forrest Gunnison

(57) ABSTRACT

In one embodiment an IO request packet (IRP) attempting to access a computer disk is evaluated to determine if the request identifies an area of a computer disk to be accessed that is marked as bad in a file system. When the request identifies an area of the computer disk to be accessed that is marked as bad in a file system, the request is assumed to be indicative of a rootkit. In another embodiment an IO request packet is evaluated to determine if the request identifies an area of the computer disk to be accessed that was not identified in requests detected in the file system level of the kernel. When the stalled request identifies an area of the computer disk to be accessed not detected in requests detected in the file system level of the kernel, the request is assumed to be indicative of a rootkit.

11 Claims, 7 Drawing Sheets

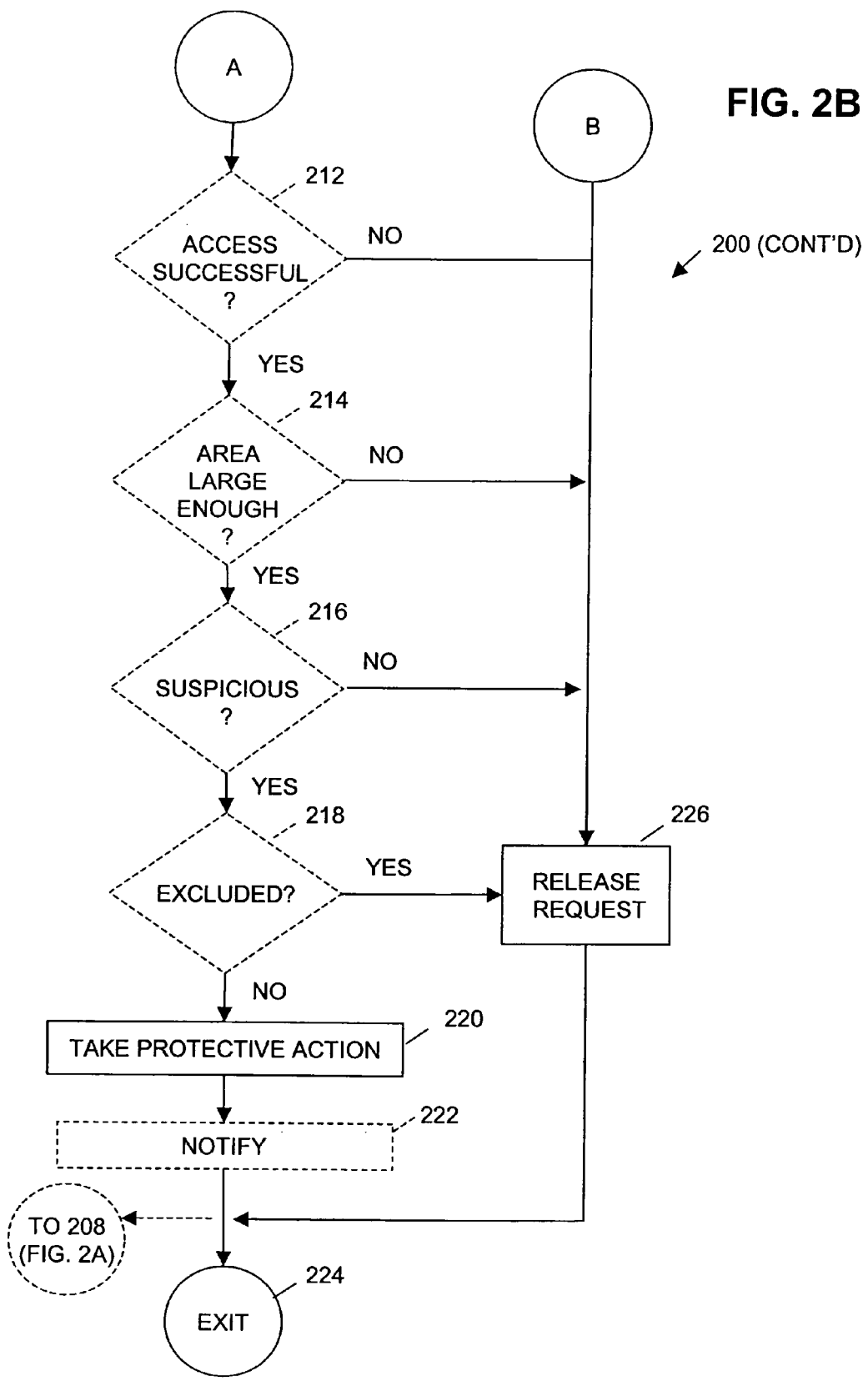

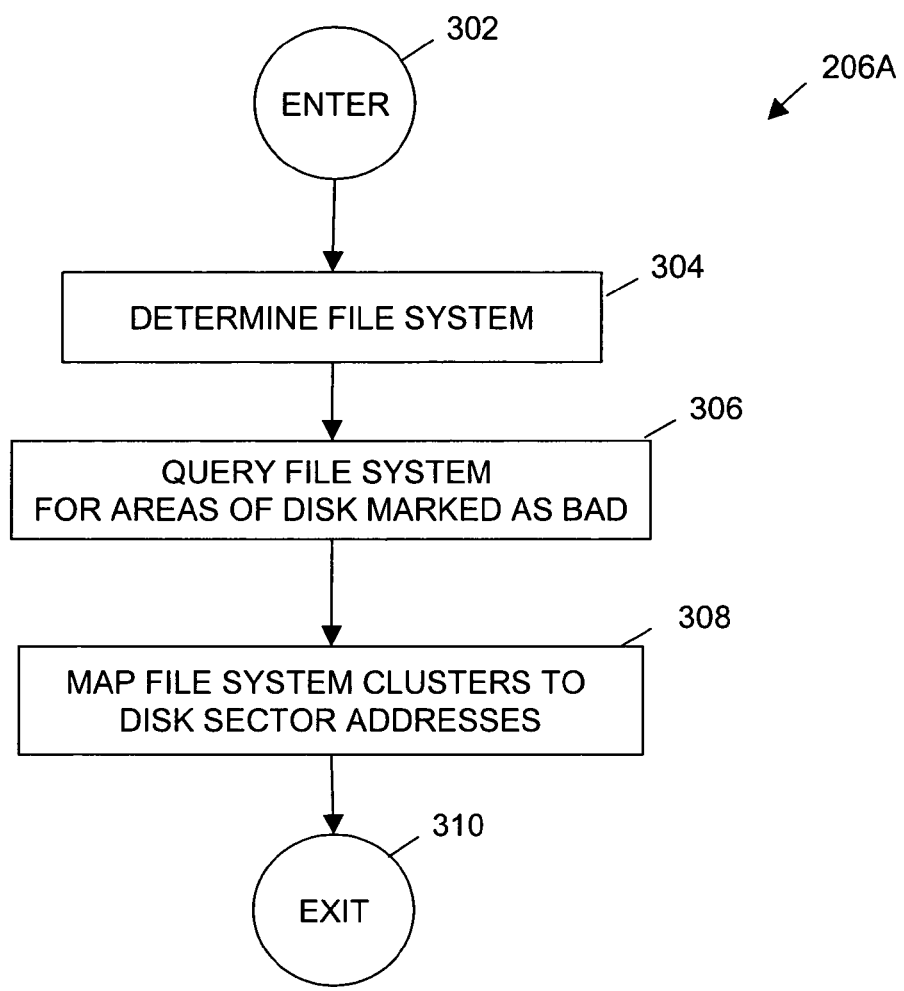

METHOD AND APPARATUS FOR DETECTING HIDDEN ROOTKITS

BACKGROUND OF THE INVENTION

1. Field of the Invention

The present invention relates to the protection of computer systems. More particularly, the present invention relates to detection of malicious code, such as rootkits, on a computer system.

2. Description of Related Art

A rootkit can be generally described as a set of programs or codes that allows the rootkit itself, and typically some additional programs or codes, to maintain an undetectable presence on a computer. Current computer system attackers use a variety of rootkit implementations to hide their activities on a computer system.

For example, some rootkits hide their files and processes, erase their activity, and alter information returned to a user or the computer system to conceal their presence on the computer system. As a rootkit is typically undetected by a user of a computer system, rootkits are typically categorized as malicious code.

SUMMARY OF THE INVENTION

According to one embodiment of the invention, a determination is made whether an IO (input/output) request packet identifies an area of a computer disk to be accessed that is marked as bad in a file system. In one embodiment, when the IO request packet identifies an area of the computer disk to be accessed that is marked as bad in a file system, the IO request packet is assumed to be indicative of malicious code, such as a rootkit hidden in the area of the disk marked as bad. In some embodiments, protective action is taken, such as failing the IO request packet. In some embodiments, a warning or other notification is provided to a user and/or system administrator.

In additional embodiments, the physical area of the computer disk identified in the IO request packet is further evaluated to determine whether the access is successful, whether the area is large enough to accommodate malicious code, and/or whether actual malicious code is detected in the area. In some embodiments, a determination is made whether the application that issued the IO request packet is excluded from a determination as malicious code.

According to another embodiment of the invention, a determination is made whether an IO request packet identifies an area of a computer disk to be accessed that was not identified in an IO request packet detected at a kernel file system level. In one embodiment, when the IO request packet does not identify an area of the computer disk to be accessed that was identified in an IO request packet detected at a kernel file system level, it is assumed the IO request packet by-passed the file system level, and is indicative of malicious code, such as a rootkit hidden in the file system level. In some embodiments, protective action is taken, such as failing the IO request packet. In some embodiments, a warning or notification is provided to a user and/or system administrator. In some embodiments, a determination is made whether the application that issued the IO request packet is excluded from a determination as malicious code.

Embodiments in accordance with the invention detect malicious code, such as rootkits hidden in areas of a computer disk marked as bad, and/or rootkits hidden in the kernel file system level, and permit protective action to be taken to prevent unauthorized access to a computer disk on a host computer system.

Embodiments in accordance with the present invention are best understood by reference to the following detailed description when read in conjunction with the accompanying drawings.

BRIEF DESCRIPTION OF THE DRAWINGS

FIG. 3 illustrates a flow diagram of a method for determining areas of a computer system disk marked as bad in accordance with one embodiment of the invention.

Common reference numerals are used throughout the drawings and detailed description to indicate like elements.

DETAILED DESCRIPTION

Figure 1:
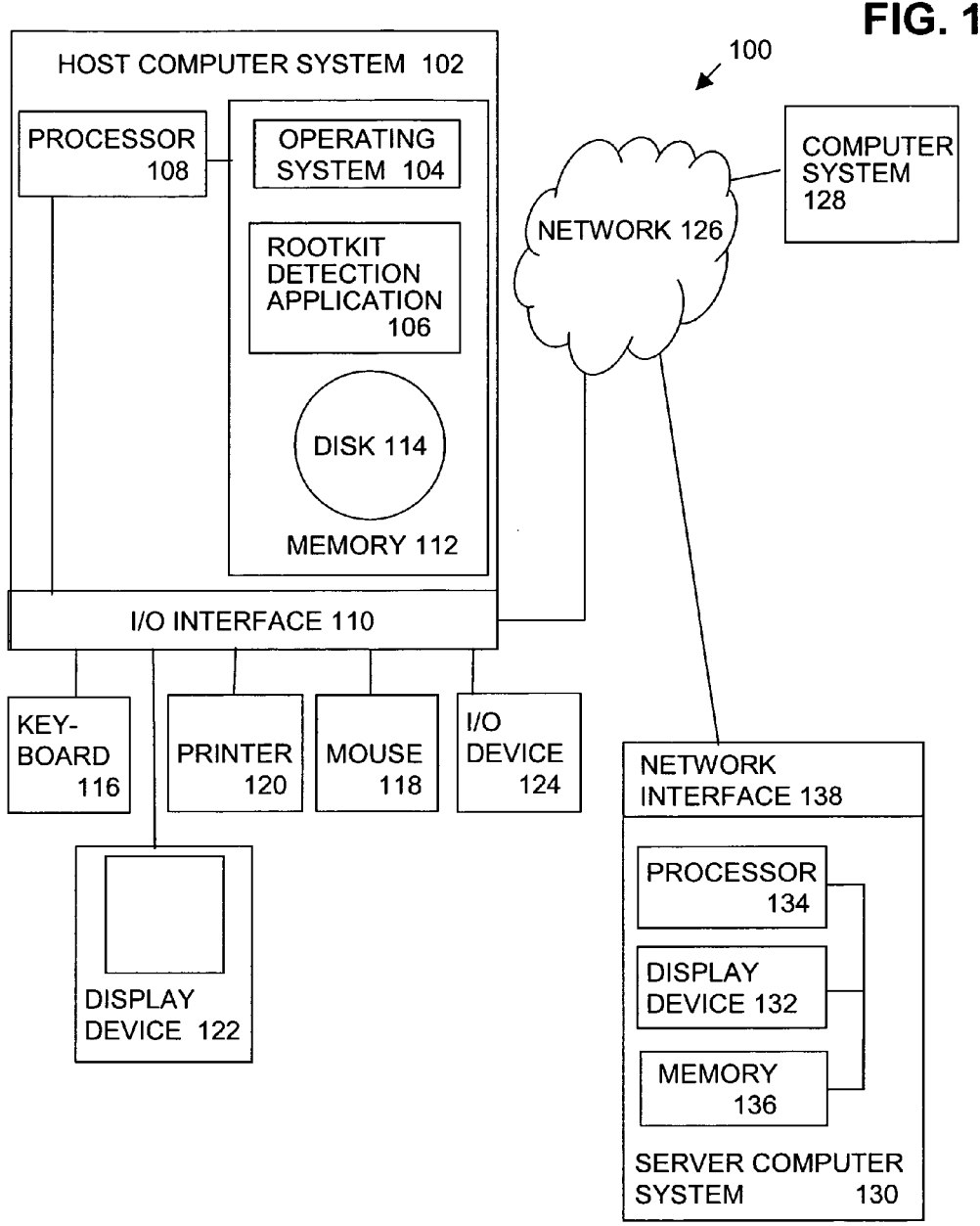
FIG. 1 is a diagram of a client-server system that includes a rootkit detection application executing on a host computer system in accordance with one embodiment of the invention.

Rootkits frequently attempt to install at several locations on a computer system. Some rootkits attempt to hide within areas of a computer disk marked as bad. As areas of a computer disk marked as bad are not used during normal file system operations, the rootkit is undetected on the computer system and available for use in a hidden rootkit attack.

One embodiment in accordance with the invention detects rootkits hidden in areas of a computer disk marked as bad using an on-access implementation. Referring generally to FIG. 2, in one embodiment, a rootkit detection application includes a kernel mode disk detection driver component that attaches to a lowest level disk driver that supports accesses to a computer disk by hooking one or more critical dispatch routines in a driver dispatch table of the disk driver (operation 204). In particular, in one embodiment, one or more critical dispatch routines in the driver dispatch table are directly modified to point to the disk detection driver of the rootkit detection application rather than an associated critical IO operation originally pointed to in the critical dispatch routine.

By hooking the one or more critical dispatch routines, IO Request Packets (IRPs), herein simply termed requests, associated with the one or more critical dispatch routines are first passed to the disk detection driver rather than the associated critical IO operation. In this way the disk detection driver is able to monitor all disk access to the computer disk below the file system level on a computer system.

In one embodiment, a user mode query program component of the rootkit detection application determines the areas of the disk marked as bad from the file system(s) supporting the disk and generates a bad area list including entries identifying areas of the disk marked as bad (operation 206). In one embodiment, the areas of the disk marked as bad are determined from a master file table, or other data structure, maintained by the file system that indicates areas of the disk marked as bad.

The disk detection driver stalls a request to a critical dispatch routine (operation 208), and a determination is made whether the request identifies an area of the disk marked as bad (operation 210). In one embodiment, when the request identifies an area of the disk that corresponds to an entry in the bad area list, the request is determined to identify an area of the disk marked as bad. In one embodiment, when a request identifies an area of the disk marked as bad, the request is automatically determined to be indicative of malicious code, such as a rootkit hidden in an area of the disk marked as bad, and protective action is taken (operation 220), such as failing the request. In some embodiments, additionally a warning or other notification is displayed to the user (operation 222).

In optional embodiments, rather than automatically determining that a request that identifies an area of the disk marked as bad is indicative of malicious code, further evaluations are performed including whether the request to access the area of the disk marked as bad is actually successful (operation 212), whether the area of the disk is large enough to reasonably contain malicious code (operation 214), and/or whether the actual data in the area of the disk contains suspicious information (operation 216). In some embodiments, an optional exclusion check (operation 218) is performed.

Differently from hiding data and code in areas of a disk marked as bad, some attackers hide rootkits in the file system level of the kernel and manipulate file system access. These rootkits attach to file system drivers, such as an NTFS driver. These file system level rootkits are typically loaded after protective applications, such as anti-virus (AV) applications, which typically load at boot-up. Thus the file system level rootkit is loaded above the protective application on the stack, and is able to pass requests, e.g., IRPs, to lower file system drivers and by-pass the protective application. As a result the protective application is not able to monitor file system level events initiated by the rootkit, and the rootkit runs hidden from the protective application.

Another embodiment in accordance with the invention detects hidden file system level rootkits. In one embodiment, a rootkit detection application utilizes a "sandwich" solution around the higher level file system filter driver stack and the lower level disk driver to identify hidden actions of file system level rootkits by identifying IRPs, i.e., requests, in real-time that by-pass the higher level file system level drivers.

Figure 5:
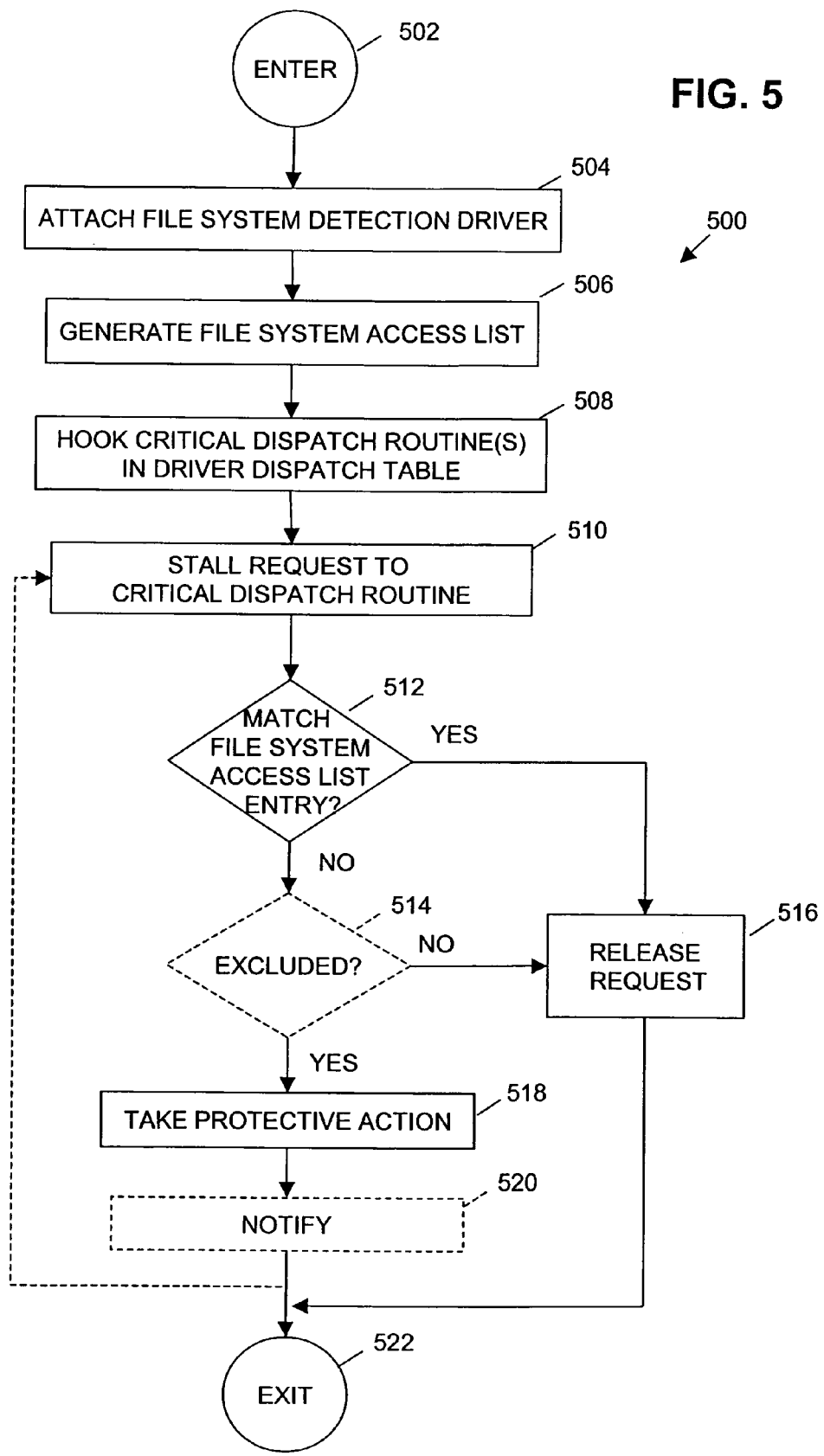
FIG. 5 illustrates a flow diagram of a method for detecting a hidden file system rootkit in accordance with one embodiment of the invention.

Referring generally to FIG. 5, in one embodiment, a rootkit detection application includes a kernel mode file system detection driver component and a kernel mode disk detection driver component. In one embodiment, the file system detection driver attaches to the file system drivers of a computer system (operation 504), and monitors IRPs to the file system drivers.

In one embodiment, the file system detection driver receives requests passed to the file system level and generates a file system access list including entries of areas of the disk to be accessed identified in requests detected by the file system detection driver (operation 506).

In one embodiment, the disk detection driver attaches to a lowest level disk driver that supports access to a computer disk by hooking one or more critical dispatch routines in a driver dispatch table of the disk driver (operation 508). In particular, in one embodiment, one or more critical dispatch routines in the driver dispatch table are directly modified to point to the disk detection driver of the rootkit detection application rather than an associated critical IO operation originally pointed to in the critical dispatch routine.

By hooking the one or more critical dispatch routines, requests associated with the one or more critical dispatch routines are first passed to the disk detection driver rather than the associated critical IO operation. In this way the disk detection driver is able to monitor all disk access to the computer disk below the file system level on a computer system.

When a request is received by the disk detection driver, the disk detection driver stalls the request (operation 510), and determines whether the request identifies an area of the disk to which access was requested in a request detected at the file system level (operation 512). In one embodiment, when the request does not identify an area of the disk that corresponds to an entry in the file system access list, it is assumed that the request has by-passed the file system level, and any protective applications installed in the file system level, and the request is determined to be indicative of malicious code.

In one embodiment, when a request is determined to be indicative of malicious code, such as a rootkit hidden in the file system level, protective action is taken (operation 518), such as failing the call. Thus, the rootkit user will not be able to successfully access the disk. In some embodiments, additionally a warning or other notification is displayed to the user (operation 520).

The following embodiments in accordance with the invention are described with reference to a Windows operating system, such as Windows 2000/XP/NT, however, those of skill in the art can recognize that the present invention is applicable to other operating systems as well. Herein, in one embodiment, malicious code is defined as any computer program, module, set of modules, or code that enters a computer system environment without an authorized user's knowledge and/or without an authorized user's consent. A rootkit hidden in an area of a disk marked as bad and a rootkit hidden in the file system level of a computer system are examples of malicious code.

Referring now to FIG. 1, FIG. 1 is a diagram of a client-server system 100 that includes a rootkit detection application 106 executing on a host computer system 102, e.g., a first computer system, in accordance with one embodiment of the present invention. Host computer system 102, sometimes called a client or user device, typically includes a central processing unit (CPU) 108, hereinafter processor 108, an input/output (I/O) interface 110, a memory 112, and an operating system 104.

In one embodiment, memory 112 includes a disk 114 for permanent storage of files, sometimes called non-volatile memory, non-temporary storage memory, non-temporary storage media, or permanent storage memory. For example, disk 114 is a hard drive, e.g., a magnetic hard drive, a floppy disk, a CD-ROM, and/or a DVD. Generally, files stored in permanent storage memory, e.g., a magnetic hard disk, a floppy disk, a CD-ROM, a DVD, are unaffected and maintained, i.e., are not lost, upon powering down (turning off) of host computer system 102. Stated another way, the permanent storage memory stores files absent voltage to the permanent storage memory.

In various embodiments, memory 112 further includes volatile memory for non-permanent storage of files, sometimes called temporary storage memory, non-temporary storage media, or non-permanent storage memory. Generally, files stored in non-permanent storage memory, are lost upon powering down (turning off) of host computer system 102.

In one embodiment, operating system 104 is a page based virtual memory system that uses pages, e.g., memory areas. For example, Windows 2000/XP/NT are 32-bit operating systems widely used on home and business computer systems. Windows 2000/XP/NT provide page-based virtual memory management schemes that permit programs to realize a 4 GB (gigabyte) virtual memory address space.

In one embodiment, when processor 108 is running in virtual memory mode, all addresses are presumed virtual addresses and are translated, or mapped, to physical addresses on disk 114 each time processor 108 executes a new instruction to access memory. Thus a physical address of disk 114 can be accessed by operating system 104 and data input to disk 114, e.g., a write operation, or output from disk 114, e.g., a read operation.

Conventionally, the 4 GB virtual memory address space is divided into two parts: a lower 2 GB user address space, also referred to as user mode address space, or ring 3, available for use by a program; and, a high 2 GB system address space, also referred to as kernel address space, or ring 0, reserved for use by the operating system.

To protect the integrity of the operating system code, and other kernel address space code and data structures from errant or malicious programs, and to provide efficient system security (user rights management), Windows operating systems, such as Window 2000/XP/NT, separate code executing in the user address space, e.g., user mode, from code executing in the kernel address space, e.g., kernel mode. User mode code typically does not have direct access to kernel mode code and has restricted access to computer system resources and hardware. To utilize kernel mode code functionalities, such as access to disks and network connections, user mode programs utilize application program interfaces (APIs) that interface between the user mode and kernel mode functions.

To interface applications and the operating system interface with hardware devices, such as the hard disk(s) utilized by the computer system, Windows operating systems utilize an input/output (IO) system. The IO manager of the IO system connects applications and system components to virtual, logical, and physical devices, and defines the infrastructure that supports device drivers.

The IO manager communicates most IO requests to drivers using IRPs (IO requests packets). The IRP typically includes the IO request and maintains information about the status of the request as it passes through the drivers that handle it. An IRP is typically composed of a header of fixed size and a variably sized array of parameters that describe sub-requests.

An IRP is usually handled by a stack of drivers. The IRP is passed from a highest level driver to lower level drivers. Typically last loaded drivers receive the IRP and pass the IRP down to earlier loaded drivers. Thus, for example, an IRP to access an area of a disk typically passes through any file system filter drivers attached to file system drivers, to file system drivers, and then to a disk driver level. The disk driver provides an IO interface for a particular disk. When a driver receives an IRP, it performs the IRP specified operation in accordance with an associated dispatch routine and passes the IRP back to the IO manager.

A dispatch routine is an IRP processing routine of a kernel mode driver, such as a disk driver. Typically a disk driver supports a number of dispatch routines. A disk driver exports entry points for these dispatch routines through a dispatch table in a driver object structure associated with the disk driver. The driver object represents the image of the loaded disk driver. Thus, a disk driver has an associated dispatch table including one or more entries of dispatch routines that correspond to a particular IRP specified operation, such as an IO operation.

Disk 114 is typically divided into sectors that are addressable blocks of a fixed size, for example, 512 bytes. Windows operating systems divide a disk into areas known as partitions and use file systems to format each partition as one or more volumes. Typically, a disk can have up to four primary partitions. However, primary partitions can be further divided into additional partitions resulting in a number of partitions and volumes on a disk.

As described above, data is stored in a volume of a disk in accordance with a file system. A file system defines a format for the storage of data on a disk, and more particularly, in a volume of a disk. Windows operating systems typically support several file systems such as the NTFS (native file system); the CDFS (CD-ROM file system); and the FAT (file allocation table file system).

Windows operating systems store data in fixed length blocks of bytes called clusters. Clusters are addressable blocks defined during a high level formatting of a disk performed by the operating system. Clusters are typically a multiple of a sector size. The file system references, i.e., maps, the sectors of a disk to clusters utilized by the file system.

Typically a file system driver implements a file system. The file system driver maintains a table, or other data structure, that includes settings that indicate the various states of the clusters on the disk. When sectors of the disk become unusable by the operating system, the clusters that map to these sectors are no longer usable by the operating system. In these instances, a file system indicates the clusters of the disk are no longer usable in the table or other data structure.

Clusters of the disk that are marked as not available to the operating system, are commonly referred to as "bad". For example, in NTFS, a setting in a main file table (MFT) maintained by the NTFS file system driver is set to indicate that the affected clusters of the disk are bad and are unusable by the operating system. Typically, an area of a disk is marked as bad due to physical damage to the disk, or data corruption. In these instances, the cluster is actually unusable, or invalid for use.

In some instances, however, a rootkit can change a setting in the file system driver, such as the master file table, to falsely mark a valid cluster as "bad". Thus, the file system will not attempt to use the clusters falsely marked as bad, however, the rootkit can now store data or code in the clusters of the disk now falsely marked as "bad" because the clusters are actually usable. As the operating system no longer accesses the falsely marked "bad" clusters of the disk, due to the change in the file system setting, the rootkit code is hidden on the computer system. Thus herein an area of a computer disk marked as bad can be actually invalid for use or valid for use and falsely marked as bad.

Host computer system 102 may further include standard devices like a keyboard 116, a mouse 118, a printer 120, and a display device 122, as well as, one or more standard input/output (I/O) devices 124, such as a compact disk (CD) or DVD drive, floppy disk drive, or other digital or waveform port for inputting data to and outputting data from host computer system 102. In one embodiment, rootkit detection application 106 is loaded into host computer system 102 via IO device 124, such as from a CD, DVD or floppy disk containing rootkit detection application 106.

Host computer system 102 is coupled to a server system 130 of client-server system 100 by a network 126. Server system 130 typically includes a display device 132, a processor 134, a memory 136, and a network interface 138.

Further, host computer system 102 is also coupled to a computer system 128, such as an attacker computer system, of client-server system 100 by network 126. In one embodiment, computer system 128 is similar to host computer system 102 and, for example, includes a central processing unit, an input output (I/O) interface, and a memory. Computer system 128 may further include standard devices like a keyboard, a mouse, a printer, a display device and an I/O device (s). The various hardware components of computer system 128 are not illustrated to avoid detracting from the principles of the invention.

Network 126 can be any network or network system that is of interest to a user. In various embodiments, network interface 138 and I/O interface 110 include analog modems, digital modems, or a network interface card.

In one embodiment of the invention, rootkit detection application 106 is typically stored in memory 112 of host computer system 102 and executed on host computer system 102. The particular type, and configuration, of host computer system 102, computer system 128, and server system 130 are not essential to the present invention.

Figure 2A:
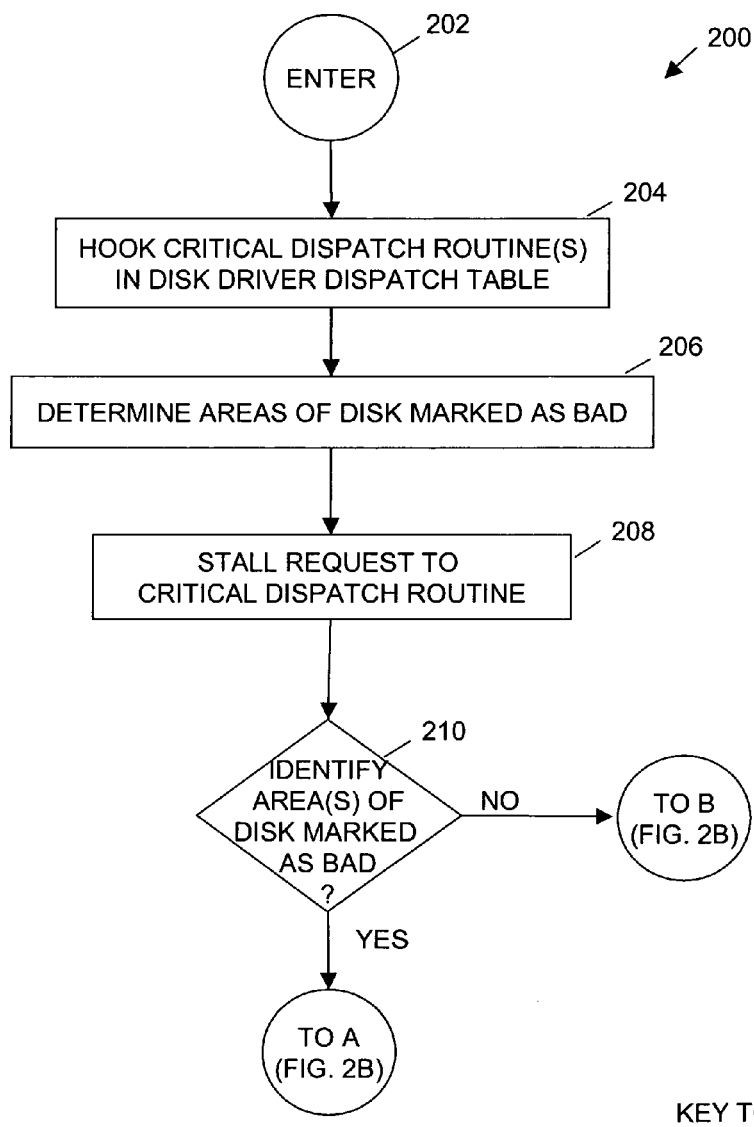
FIG. 2 is a key to FIGS. 2A and 2B and illustrates a flow diagram of a method for detecting a rootkit hidden in areas of a computer disk marked as bad in accordance with one embodiment of the invention.
Figure 4:
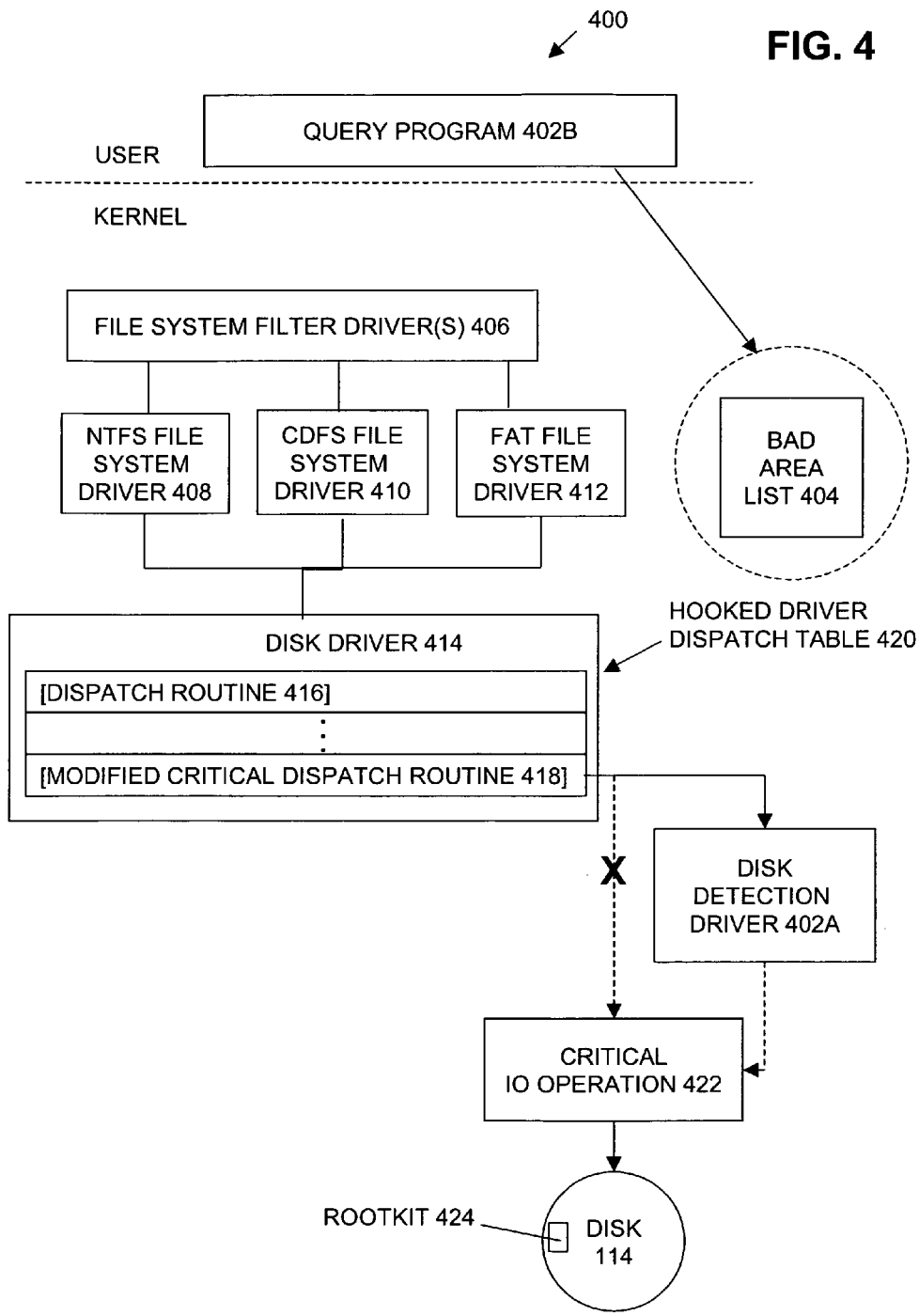
FIG. 4 is a diagram illustrating detecting a rootkit hidden in an area of a computer disk marked as bad in accordance with one embodiment of the invention.

FIG. 2 is a key to FIGS. 2A and 2B and illustrates a flow diagram of a method 200 for detecting a rootkit hidden in areas of a computer disk marked as bad in accordance with one embodiment of the invention. FIG. 4 is a diagram 400 illustrating detecting a rootkit hidden in an area of a computer disk marked as bad in accordance with one embodiment of the invention.

Referring now to FIGS. 1, 2 and 4 together, in one embodiment of the invention, execution of rootkit detection application 106 by processor 108 results in the operations of method 200 as described below. In the present embodiment, rootkit detection application 106 is installed on host computer system and includes a kernel mode component, disk detection driver 402A, and a user mode component, query program 402B. In one embodiment, method 200 is entered at an ENTER operation 202, and from ENTER operation 202, processing transitions to a HOOK CRITICAL DISPATCH ROUTINE(S) IN DISK DRIVER DISPATCH TABLE operation 204.

In HOOK CRITICAL DISPATCH ROUTINE(S) IN DISK DRIVER DISPATCH TABLE operation 204, one or more critical dispatch routines are hooked in a driver dispatch table of a disk driver associated with a computer disk of host computer system 102. Herein, in one embodiment, a critical dispatch routine is an IRP processing routine that implements a critical IO operation on a disk, e.g., disk 114 of host computer system 102.

Herein in one embodiment, a critical IO operation is an IO operation that accesses a disk. In particular, in one embodiment, a critical IO operation is an operation invokable by IRPS used to access a disk, including IRP_MJ_DEVICE_CONTROL, IRP_MJ_READ, and/or IRP_MJ_WRITE.

In one embodiment, disk detection driver 402A attaches to the lowest level disk driver above disk 114, e.g., disk driver 414, by hooking one or more critical dispatch routines in the driver dispatch table associated with disk driver 414. In particular, in one embodiment, one or more critical dispatch routines in the driver dispatch table of the driver object associated with disk driver 414 are directly modified to point to disk detection driver 402A rather than an associated critical IO operation originally pointed to by the critical dispatch routine. For example, in FIG. 4, modified critical dispatch routine 418 illustrates an original critical dispatch routine that was modified to point to disk detection driver 402A, rather than a critical IO operation 422, originally pointed to in the original critical dispatch routine (not shown).

By hooking the one or more critical dispatch routines, IRPs to critical IO operations are first passed to disk detection driver 402A rather than the associated critical IO operation, such as critical operation 422. In this way disk detection driver 402A is able to monitor disk access below the file system level, e.g., file system filter driver(s) 406, and file system drivers NTFS file system driver 408, CDFS file system driver 410, and FAT file system driver 412. From HOOK CRITICAL DISPATCH ROUTINE(S) IN DISK DRIVER DISPATCH TABLE operation 204, processing transitions to a DETERMINE AREAS OF DISK MARKED AS BAD operation 206.

In DETERMINE AREAS OF DISK MARKED AS BAD operation 206, areas of the disk, e.g., areas of disk 114, marked as bad are determined. In one embodiment, areas of the disk marked as bad are determined from the file system associated with the disk. In one embodiment, query program 402B queries the file system mounted on disk 114 to determine the areas of disk 114 marked as bad.

For example, in one embodiment, the areas of disk 114 marked as bad are identified in a master file table maintained by the supporting file system, such as the NTFS file system implemented by NTFS file system driver 408. In one embodiment, the areas of disk 114 marked as bad are identified in the master file table by the cluster address. As disk 414 accesses disk 114 utilizing sector addresses rather than cluster addresses, in one embodiment, the cluster addresses of the areas marked as bad obtained from the file system are mapped by query program 402B to the associated sector addresses of disk 114.

In one embodiment, query program 402B generates a bad area list 404 including one or more entries of the sector addresses of the areas marked as bad on disk 114. In one embodiment, bad area list 404 is stored in a memory structure of rootkit detection application 106, or in another location. One embodiment of a method for determining areas of the disk marked as bad, and for generating a bad area list, is further described herein with reference to FIG. 3 and a method 206A. From DETERMINE AREAS OF DISK MARKED AS BAD operation 206, processing transitions to a STALL REQUEST TO CRITICAL DISPATCH ROUTINE operation 208.

In STALL REQUEST TO CRITICAL DISPATCH ROUTINE operation 208, a request to a hooked critical dispatch routine is stalled. For example, in FIG. 4 a request associated with critical IO operation 422 is forwarded to hooked driver dispatch table 420, and in particular modified critical dispatch routine 418. Modified critical dispatch routine 418 forwards the request to disk detection driver 402A where the request is stalled, rather than to critical IO operation 422. From STALL REQUEST TO CRITICAL DISPATCH ROUTINE operation 208, processing transitions to an IDENTIFY AREA(S) OF DISK MARKED AS BAD check operation 210.

In IDENTIFY AREA(S) OF DISK MARKED AS BAD check operation 210, a determination is made whether the request stalled in operation 208 is attempting to access an area of the disk marked as bad. In one embodiment, disk detection driver 402A evaluates the stalled request and determines whether or not the request is attempting to access an area of disk 114 marked as bad by the file system, e.g., NTFS.

In one embodiment, a target address parameter in a field of the request that identifies the area of disk 114 to be accessed is compared to entries in bad area list 404. In one embodiment, when the target address parameter of the request matches, or otherwise corresponds to, an entry, or is within a range of sector addresses, marked as bad in bad area list 404, a determination is made that the request identifies an area of disk 114 marked as bad. Otherwise, a determination is made that the request does not identify an area of disk 114 marked as bad.

When the request does not identify an area of the disk marked as bad ("NO"), the request is assumed not indicative of a hidden rootkit, and from IDENTIFY AREA(S) OF DISK MARKED AS BAD check operation 210, processing transitions to a RELEASE REQUEST operation 226.

In RELEASE REQUEST operation 226, the request stalled at operation 208 is released and is allowed to complete. In one embodiment, rootkit detection application 106 returns control to the critical dispatch routine, or otherwise invokes critical IO operation 422. From RELEASE REQUEST operation 226, processing exits at an EXIT operation 224, or optionally returns to operation 208 upon receipt of a next request to a critical dispatch routine.

Referring again to IDENTIFY AREA(S) OF DISK MARKED AS BAD check operation 210, alternatively, when the request identifies an area of the disk marked as bad ("YES"), in one embodiment, the request is automatically assumed indicative of a rootkit hidden in an area of the disk marked as bad, e.g., rootkit 424. From IDENTIFY AREA(S) OF DISK MARKED AS BAD check operation 210, processing transitions to an optional EXCLUDED check operation 218, or directly to a TAKE PROTECTIVE action operation 220, if optional EXCLUDED check operation 218 is not performed.

In another embodiment, rather than automatically assuming the request is indicative of a hidden rootkit, from IDENTIFY AREA(S) OF DISK MARKED AS BAD check operation 210, processing transitions to an optional ACCESS SUCCESSFUL check operation 212. In ACCESS SUCCESSFUL check operation 212, when a request identifies an area of the disk marked as bad, a determination is made whether the request to access the area of the disk marked as bad is actually successful. For example, in one embodiment, disk detection driver 402A forwards the request, and on return stalls the response. If the requested operation is performed, for example, data is read from disk 114, the access is determined to be successful. As the access was successful, it is assumed the area of the disk was falsely marked as bad in the file system, such as by malicious code, e.g., a rootkit.

Alternatively, when the requested operation is not performed, for example, data cannot be read from disk 114, the access is determined not to be successful. As the access was not successful, it is assumed the area of disk was validly marked as bad in the file system, and is unusable.

When a request to access an area of the disk marked as bad is not successful ("NO"), the request is not determined to be indicative of a hidden rootkit and processing transitions from ACCESS SUCCESSFUL check operation 212 to RELEASE REQUEST operation 226. In this case as the requested operation has been performed, RELEASE REQUEST operation 226 returns the response to the request.

Alternatively, when a request to access an area of the disk marked as bad is successful ("YES"), the request is determined to be indicative of a hidden rootkit. In one embodiment, the successful response is also stalled, and processing transitions from ACCESS SUCCESSFUL check operation 212 to optional EXCLUDED check operation 218, or directly to TAKE PROTECTIVE action operation 220, if optional EXCLUDED check operation 218 is not performed.

In yet another embodiment, rather than automatically assuming the request is indicative of a hidden rootkit, from IDENTIFY AREA(S) OF DISK MARKED AS BAD check operation 210, processing transitions to an optional AREA LARGE ENOUGH check operation 214. In AREA LARGE ENOUGH check operation 214, when a request identifies an area of the disk marked as bad, a determination is made whether the request, i.e., the target address parameter of the request, identifies an area of the disk marked as bad large enough to contain rootkit code, e.g., malicious code.

For example, in one embodiment, the area of disk 114 identified by the target address parameter is compared to minimum size threshold parameter. Areas greater than the minimum size threshold are determined to be large enough to contain rootkit code, and areas equal to or less than the minimum size threshold are determined not to be large enough to contain rootkit code.

When the request identifies an area of the disk marked as bad that is not large enough to contain rootkit code ("NO"), the request is assumed not to be indicative of a hidden rootkit and processing transitions from AREA LARGE ENOUGH check operation 214 to RELEASE REQUEST operation 226 earlier described. Alternatively, when the request identifies an area of the disk marked as bad that is large enough to contain rootkit code ("YES"), the request is assumed to be indicative of a hidden rootkit and processing transitions from AREA LARGE ENOUGH check operation 214 to optional EXCLUDED check operation 218, or directly to TAKE PROTECTIVE action operation 220, if optional EXCLUDED check operation 218 is not performed.

In yet another embodiment, rather than automatically assuming the request is indicative of a hidden rootkit, from IDENTIFY AREA(S) OF DISK MARKED AS BAD check operation 210, processing transitions to an optional SUSPICIOUS check operation 216. In SUSPICIOUS check operation 216, when a request identifies an area of the disk marked as bad, the actual data in the area of the disk is evaluated to determine whether it contains suspicious information such as executable code, and/or fragments of rootkit tools.

For example, in one embodiment, the data in the area of disk 114 identified by the target address parameter of the request is scanned, or otherwise evaluated, for suspicious information. In one embodiment, the data is scanned by a computer security application, such as an anti-virus application. When the request identifies an area of the disk marked as bad that does not include suspicious information ("NO"), the request is assumed not to be indicative of a hidden rootkit and processing transitions from SUSPICIOUS check operation 216 to RELEASE REQUEST operation 226 earlier described. Alternatively, when the request identifies an area of the disk marked as bad that includes suspicious information ("YES"), the request is assumed to be indicative of a hidden rootkit and processing transitions from SUSPICIOUS check operation 216 to optional EXCLUDED check operation 218, or directly to TAKE PROTECTIVE action operation 220, if optional EXCLUDED check operation 218 is not performed.

Referring now to optional EXCLUDED check operation 218, when a request is initially determined to be indicative of a rootkit, a determination is made whether the request is excluded, and is instead defined as not indicative of a rootkit. For example, in one embodiment, a request issued by a disk repair and recovery application is excluded.

In one embodiment, the source of the request is determined, for example, from the process context, or from an identifier in the request that allows the source application to be identified, such as through a trace back. Trace back techniques are well-known to those of skill in the art and are not further described herein to avoid detracting from the principles of the invention. In one embodiment, a source identifier, such as the source application name, is compared to entries in an exclusion list, maintained by or accessible by rootkit detection application 106. In one embodiment, the exclusion list includes one or more entries that identify applications to be excluded from a determination as a rootkit.

When the source identifier matches an entry on the exclusion list, the source application is excluded; otherwise, the source application is not excluded. If the source application is excluded ("YES"), the request to access an area of the disk marked as bad is defined as not indicative of a hidden rootkit, and from EXCLUDED check operation 218, processing transitions to RELEASE REQUEST operation 226, earlier described. In one embodiment, where the response to a successful access in operation 212 is stalled, the response is allowed to return. Referring again to EXCLUDED check operation 218, alternatively, if the source application is not excluded ("NO"), the request to access an area of the disk marked as bad is determined to be indicative of a hidden rootkit and from EXCLUDED check operation 218, processing transitions to TAKE PROTECTIVE ACTION operation 220.

In TAKE PROTECTIVE ACTION operation 220, protective action is taken. In one embodiment, the request is failed, e.g., terminated, and the failure returned. In this way the source application does not receive access to the requested areas of the disk marked as bad, thus preventing unauthorized access by malicious attackers or malware. In one embodiment, where the response to a successful access in operation 212 is stalled, the response is not returned. Further in some embodiments, the response is written to a text file, or otherwise saved for later evaluation.

In some embodiments, the source application is traced back from the request and identified. In some embodiments, the source application is scanned, quarantined, or deleted. In one embodiment, the user is prompted for input prior to taking protective action, e.g., the user is asked for permission to take protective action. From TAKE PROTECTIVE ACTION operation 220, processing optionally transitions to a NOTIFY operation 222.

In optional NOTIFY operation 222, the user of host computer system 102, and/or a system administrator, are notified that protective action has been taken on host computer system 102, e.g., that a request to access an area of the disk marked as bad has been failed. The user can also be notified that malicious code, such as a rootkit hidden in an area of the disk marked as bad is indicated.

The user and/or administrator can be notified using any one of a number of techniques, e.g., by using a pop up window, by generating an e-mail, by writing to a file and/or otherwise by logging the event. Further, a notification can be provided to a security center. From optional NOTIFY operation 222, processing transitions to EXIT operation 224, or optionally returns to operation 208 on receipt of a next request to a critical dispatch routine.

In an alternate embodiment, rootkit detection application 106 does not utilize a kernel mode disk detection driver, e.g., disk detection driver 402A, on Windows 2000/XP systems. Instead rootkit detection application 106 accesses a Windows Event Tracing facility provided by the operating system to connect to driver providers for information about system events, such as low level IO information. Such information can be used by the rootkit detection application in a user mode service implementation to obtain a similar functionality, however such an embodiment may be less secure.

FIG. 3 illustrates a flow diagram of a method 206A for determining areas of a computer system disk marked as bad in accordance with one embodiment of the invention. Referring now to FIGS. 2, 3, and 4 together, in one embodiment, from operation 206 (FIG. 2) processing enters method 206A at an ENTER operation 302, and processing transitions from ENTER operation 302 to a DETERMINE FILE SYSTEM operation 304.

In DETERMINE FILE SYSTEM operation 304, in one embodiment, the file system supporting a disk is determined. In one embodiment, query program 402B queries operating system 104, such as the volume manager of operating system 104, for the file system supporting disk 114. The volume manager returns the file system supporting disk 114 and the disk that the file system is mounted on, e.g., disk 114. From DETERMINE FILE SYSTEM operation 304, processing transitions to a QUERY FILE SYSTEM FOR AREAS OF DISK MARKED AS BAD operation 306.

In QUERY FILE SYSTEM FOR AREAS OF DISK MARKED AS BAD operation 306, the file system obtained in operation 304 is queried for areas of the disk marked as bad. In one embodiment, query program 402B queries, the file system, for example, NTFS, for areas of disk 114 marked as bad. In one embodiment, a master table file, or other structure, of the file system is queried for areas of the disk marked as bad. Typically, the areas of the disk marked as bad are referenced in the file system as logical cluster addresses. From QUERY FILE SYSTEM FOR AREAS OF DISK MARKED AS BAD operation 306, processing transitions to a MAP FILE SYSTEM CLUSTERS TO DISK SECTOR ADDRESSES operation 308.

In MAP FILE SYSTEM CLUSTERS TO DISK SECTOR ADDRESSES operation 308, logical cluster addresses obtained from the file system are converted, e.g., mapped, to corresponding physical sectors of the disk, for example as sector addresses. As disk drivers utilize sector addresses in addressing a disk, the areas of the disk marked as bad obtained from the file system need to be converted to sector addresses utilized by the disk driver.

In one embodiment, query program 402B generates a bad area list, such as bad area list 404 including entries of areas of disk 114 marked as bad by the file system. From MAP FILE SYSTEM CLUSTERS TO DISK SECTOR ADDRESSES operation 308, processing exits method 206A at an EXIT operation 310 and returns to method 200 and enters operation 208.

The above embodiments in accordance with the invention detect requests to access areas of a disk marked as bad that are indicative of malicious code, such as a hidden rootkit. Thus, these rootkits are prevented from exploiting host computer system 102 using code hidden in areas of the disk marked as bad.

Another embodiment of the invention detects rootkits hidden on file system drivers. Often file system filter drivers are attached to file system drivers. Generally file system filter drivers provide the ability to see file system requests and to optionally modify or complete them, prior to the file system driver receiving the file system requests.

Conventional on-access virus scanners typically include a file system filter driver that intercepts IRPs that deliver IRP_MJ_CREATE commands that issue whenever an application opens a file. Before propagating the IRP to the file system driver to which the command is directed, the virus scanner examines the file being opened to ensure it is clean of a virus. If the file is clean, the virus scanner passes the IRP on, but if the file is infected, the virus scanner can quarantine, clean the file, or fail the IRP.

In Window operating systems, one or more file system filter drivers can be successively attached to a file system driver. Thus, for example, a first loaded file system filter driver would attach to the file system driver, and a second loaded file system filter driver would attach to the first loaded file system filter driver. When a request is passed in, for example from a user application, the request passes first to the last loaded file system filter driver, e.g., the second loaded file system filter driver.

As earlier described, rootkits attempt to install at several locations on a computer system. Recently some attackers implement rootkits that manipulate system level file access. In particular, some rootkits attach to file systems drivers, such as an NTFS file system driver, and manipulate system level file access. Consequently, if a file system filter driver component of a virus scanner, or other protective program, is loaded first on a computer system, the rootkit program attaches above the virus scanner component, and is able to bypass the virus scanning component and pass IRPs to lower levels. As a result the virus scanning component is unable to monitor file system level events when the rootkit is installed on the system.

In accordance with another embodiment of the invention, rootkit detection application 106 includes two kernel mode components. A file system detection driver component and a disk detection driver component. In one embodiment, the file system detection driver attaches to a file system filter driver and monitors IRPs related to file access. The file system detection driver tracks executable file access of the file system and identifies which areas of the disk are to be accessed.

In one embodiment, targeted clusters to be accessed on the disk are mapped to physical sectors, e.g., sector addresses, and the locations maintained in a file accessible by the disk detection driver. Thus, in one embodiment, the file system detection driver maintains the sector addresses, and/or range of sector addresses associated with IRP access requests detected at the file system level in a file system access file.

The disk detection driver attaches to the disk driver by hooking critical dispatch routines in the driver dispatch table of the disk driver. In particular, critical dispatch routines are modified to point to the disk detection driver. In this way IRPs to critical dispatch routines are passed to the disk detection driver, rather than an associated critical IO operation. The disk detection driver determines whether the request is attempting to access an area of the disk identified in the file system access file generated by the file system detection driver.

In one embodiment, the kernel mode detection driver determines whether a sector address identified in the IRP matches, or is within the range of sector addresses identified in the file system access file. Sector addresses that match or are within the ranges identified in the file system access file identify requests that are detected both at the file system level and at the disk driver level, and thus are not hidden and not indicative of a rootkit. Conversely, sector addresses that do not match or are not within the range identified in the file system access file are requests that have bypassed, e.g., been hidden from, the file system level, and arrived at the disk driver level, and thus are indicative of a rootkit.

Figure 6:
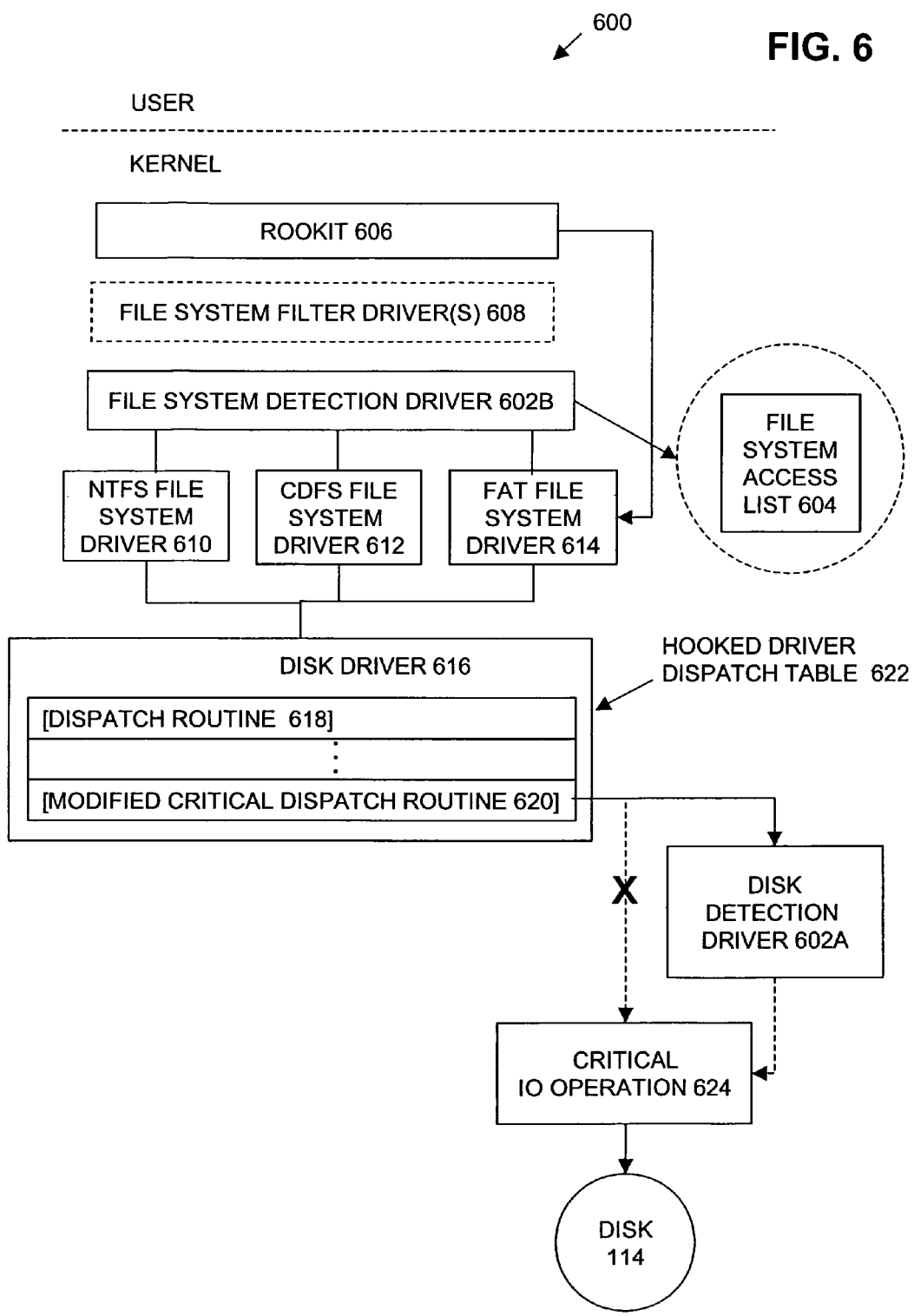
FIG. 6 is a diagram illustrating detecting a rootkit hidden in the file system level of a host computer system in accordance with one embodiment of the invention.

FIG. 5 illustrates a flow diagram of a method 500 for detecting a hidden file system rootkit in accordance with one embodiment of the invention. FIG. 6 is a diagram 600 illustrating detecting a rootkit hidden in the file system level of a host computer system in accordance with one embodiment of the invention.

Referring now to FIGS. 1, 5, and 6 together, in one embodiment of the invention, execution of rootkit detection application 106 by processor 108 results in the operations of method 500 as described below. In the present embodiment, rootkit detection application 106 is installed on host computer system 102 and includes two kernel mode components, a disk detection driver 602A, and a file system detection driver 602B. In one embodiment, method 500 is entered at an ENTER operation 502, and from ENTER operation 502, processing transitions to an ATTACH FILE SYSTEM DETECTION DRIVER operation 504.

In ATTACH FILE SYSTEM DETECTION DRIVER operation 504, file system detection driver 602B is attached to one or more file system drivers of host computer system 102. For example, in FIG. 5, file system detection driver 602B is attached to NTFS file system driver 610, CDFS file system driver 612, and FAT file system driver 614. In one embodiment, file system detection driver 602B is loaded at boot-up so that it is low on the stack of file system filter drivers and is able to monitor IRPs, i.e., requests, forwarded to the file system drivers.

Herein, in one embodiment, the file system level of the kernel includes file system drivers, and drivers attached directly and indirectly to and above the file system drivers, such as file system filter drivers. From ATTACH FILE SYSTEM DETECTION DRIVER operation 504, processing transitions to a GENERATE FILE SYSTEM ACCESS LIST operation 506.

In GENERATE FILE SYSTEM ACCESS LIST operation 506, file system detection driver 602B receives requests being passed down to the file system filter drivers and generates a file system access list 604. In one embodiment, file system access list 604 includes one or more entries that identify an area of disk 114 identified in a request to access disk 114 detected by file system detection driver 602B.

In one embodiment, when file system detection driver 602B receives a request, file system detection driver 602B determines the area of disk 114 to be accessed, such as from a target address parameter in a field of the request. If the area to be accessed in not identified in file system access list 604, file system detection driver 602B adds an entry to file system access list 604 identifying the area. In one embodiment, each entry is identified as a sector address.

In one embodiment, file system access list 604 is stored in a memory structure, such as a file. From GENERATE FILE SYSTEM ACCESS LIST operation 506, processing transitions to a HOOK CRITICAL DISPATCH ROUTINE(S) IN DRIVER DISPATCH TABLE operation 508.

In HOOK CRITICAL DISPATCH ROUTINE(S) IN DRIVER DISPATCH TABLE operation 508, one or more critical dispatch routines are hooked in a driver dispatch table of a disk driver associated with a computer disk of host computer system 102. Herein, in one embodiment, a critical dispatch routine is an IRP processing routine that implements a critical IO operation on a disk, e.g., disk 114 of host computer system 102.

Herein in one embodiment, a critical IO operation is an IO operation that accesses a disk. In particular; in one embodiment, a critical IO operation is an operation invokable by IRPS used to access a disk, including IRP_MJ_DEVICE_CONTROL, IRP_MJ_READ, and/or IRP_MJ_WRITE.

In one embodiment, disk detection driver 602A attaches to the lowest level disk driver above disk 114, e.g., disk driver 616, by hooking one or more critical dispatch routines in the driver dispatch table associated with disk driver 616. In particular, in one embodiment, one or more critical dispatch routines in the driver dispatch table of the driver object associated with disk driver 616 are directly modified to point to disk detection driver 602A rather than an associated critical IO operation originally pointed to by the critical dispatch routine. For example, in FIG. 6, modified critical dispatch routine 620 in hooked driver dispatch table 622 illustrates an original critical dispatch routine that was modified to point to disk detection driver 602A, rather than a critical IO operation 624, originally pointed to in the original critical dispatch routine.

By hooking the one or more critical dispatch routines, an IRP passed to an associated critical dispatch routine in disk driver 616 is first passed to disk detection driver 602A rather than the critical IO operation associated with the critical dispatch routine, such as critical IO operation 624. In this way disk detection driver 602A is able to monitor disk access below the file system level, e.g., file system filter driver(s) 608, and file system drivers NTFS file system driver 610, CDFS file system driver 612, and FAT file system driver 614. From HOOK CRITICAL DISPATCH ROUTINE(S) IN DISK DRIVER DISPATCH TABLE operation 508, processing transitions to a STALL REQUEST TO CRITICAL DISPATCH ROUTINE operation 510.

In STALL REQUEST TO CRITICAL DISPATCH ROUTINE operation 510, a request to a hooked critical dispatch routine is stalled. For example, in FIG. 6 a request associated with critical IO operation 624 is forwarded to hooked driver dispatch table 622, and in particular to modified critical dispatch routine 620. Modified critical dispatch routine 620 forwards the request to disk detection driver 602A where the request is stalled rather than to critical IO operation 624. From STALL REQUEST TO CRITICAL DISPATCH ROUTINE operation 510, processing transitions to a MATCH FILE SYSTEM ACCESS LIST ENTRY check operation 512.

In MATCH FILE SYSTEM ACCESS LIST ENTRY check operation 512, disk detection driver 602A determines whether the request identifies an area of disk 114 entered in file system access list 604. In one embodiment, a target address parameter in a field of the request that identifies the area of disk 114 to be accessed, e.g., a sector address, is compared to entries in file system access list 604.

In one embodiment, when the target address parameter of the request matches, or otherwise corresponds to a sector address, or is within a range of sector addresses, identified in file system access list 604, the request identifies an area of disk 114 that was detected at the file system level by file system detection driver 602B. Thus, it assumed the request did not bypass the file system level, and any protective applications installed in the file system level, if any.

Alternatively, when the target address parameter of the request does not match or otherwise does not correspond to a sector address, or is not within a range of sector addresses, identified in file system access list 604, the request does not identify an area of disk 114 that was detected at the file system level by file system detection driver 602B. Thus, it is assumed the request bypassed the file system level, and any protective applications installed in the file system level, if any.

When the request identifies an area of the disk identified in the file system access list ("YES"), the request is assumed not indicative of a hidden rootkit, and from MATCH FILE SYSTEM ACCESS LIST ENTRY check operation 512, processing transitions to a RELEASE REQUEST operation 516.

In RELEASE REQUEST operation 516, the request stalled in operation 510 is released and is allowed to complete. In one embodiment, rootkit detection application 106 returns control to the critical dispatch routine. From RELEASE REQUEST operation 516, processing exits at an EXIT operation 522, or optionally returns to operation 510 upon receipt of a next request to a critical dispatch routine.

Referring again to MATCH FILE SYSTEM ACCESS LIST ENTRY check operation 512, alternatively, when the request does not identify an area of disk 114 identified in file system access list 604 ("NO"), in one embodiment, the request is assumed indicative of a hidden rootkit, and from MATCH FILE SYSTEM ACCESS LIST ENTRY check operation 512, processing transitions to an optional EXCLUDED check operation 514, or directly to a TAKE PROTECTIVE action operation 518, if optional EXCLUDED check operation 514 is not performed.

In optional EXCLUDED check operation 514, a determination is made whether the request which is initially determined to indicative of a rootkit hidden in the file system is excluded, and is instead defined as not indicative of a rootkit. For example, in one embodiment, requests issued by a protective application, such as an AV driver, can be excluded.

In one embodiment, the source of the request is determined, for example, from the process context, or from an identifier in the request that allows the source application to be identified, such as through a trace back. Trace back techniques are well-known to those of skill in the art and are not further described herein to avoid detracting from the principles of the invention. In one embodiment, a source identifier, such as the source application name, is compared to entries in an exclusion list, maintained by or accessible by rootkit detection application 106. In one embodiment, the exclusion list includes one or more entries that identify applications to be excluded from a determination as a rootkit. When the source identifier matches an entry on the exclusion list, the source application is excluded; otherwise, the source application is not excluded.

If the source application is excluded ("YES"), the request is defined as not indicative of a hidden rootkit, and from EXCLUDED check operation 514, processing transitions to RELEASE REQUEST operation 516, earlier described. Referring again to EXCLUDED check operation 514, alternatively, if the source application is not excluded ("NO"), the request is determined to be indicative of a hidden rootkit and from EXCLUDED check operation 514, processing transitions to TAKE PROTECTIVE ACTION operation 518.

In TAKE PROTECTIVE ACTION operation 518, protective action is taken. In one embodiment, the stalled request is failed, e.g., terminated, and the failure returned. In this way the source application cannot access the requested areas of the disk, thus preventing unauthorized access by malicious attackers or malware.

In some embodiments, the source application is traced back from the request and identified. In some embodiments, the source application is scanned, quarantined, or deleted. In one embodiment, the user is prompted for input prior to taking protective action, e.g., the user is asked for permission to take protective action. From TAKE PROTECTIVE ACTION operation 518, processing optionally transitions to a NOTIFY operation 520.

In optional NOTIFY operation 520, the user of host computer system 102 and/or a system administrator are notified that protective action has been taken on host computer system 102, e.g., that a request to access an area of the disk has been failed. The user can also be notified that a hidden rootkit is indicated.

The user and/or administrator can be notified using any one of a number of techniques, e.g., by using a pop up window, by generating an e-mail, by writing to a file and/or otherwise by logging the event. Further, a notification can be provided to a security center. From optional NOTIFY operation 520, processing transitions to EXIT operation 522, or optionally returns to operation 510 on receipt of a next request to a critical dispatch routine.

In an alternate embodiment, rootkit detection application 106 does not utilize a kernel mode disk detection driver, e.g., disk detection driver 602A, on Windows 2000/XP systems. Instead rootkit detection application 106 accesses a Windows Event Tracing facility provided by the operating system to connect to driver providers for information about system events, such as low level IO information. Such information can be used by the rootkit detection application in a user mode service implementation to obtain a similar functionality, however such an embodiment may be less secure.

Referring again to FIG. 1, in one embodiment of the invention, rootkit detection application 106 is in computer memory 112. As used herein, a computer memory refers to a volatile memory, a non-volatile memory, or a combination of the two.

Although rootkit detection application 106 is referred to as an application, this is illustrative only. Rootkit detection application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor. In one embodiment, rootkit detection application 106 includes one or more system level, e.g., kernel mode, drivers.

While embodiments in accordance with the present invention have been described for a client-server configuration, an embodiment of the present invention may be carried out using any suitable hardware configuration or means involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code.

As illustrated in FIG. 1, this medium may belong to the computer system itself. However, the medium also may be removed from the computer system. For example, rootkit detection application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that can execute the functionality of rootkit detection application 106 in accordance with at least one of the embodiments as described herein. Similarly, in another embodiment, host computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the functionality of rootkit detection application 106 in accordance with one embodiment of present invention can be implemented in a wide variety of computer system configurations. In addition, the functionality of rootkit detection application 106 could be stored as different modules in memories of different devices.

For example, rootkit detection application 106 could initially be stored in server system 130, and then as necessary, a portion of rootkit detection application 106 could be transferred to host computer system 102 and executed on host computer system 102. Consequently, part of the functionality of rootkit detection application 106 would be executed on processor 134 of server system 130, and another part would be executed on processor 108 of host computer system 102. In view of this disclosure, those of skill in the art can implement various embodiments of the present invention in a wide-variety of physical hardware configurations using an operating system and computer programming language of interest to the user.

In yet another embodiment, rootkit detection application 106 is stored in memory 136 of server system 130. Rootkit detection application 106 is transferred over network 126 to memory 112 in host computer system 102. In this embodiment, network interface 138 and I/O interface 110 would include analog modems, digital modems, or a network interface card. If modems are used, network 126 includes a communications network, and rootkit detection application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A computer implemented method comprising:
    determining areas of a computer disk marked as bad, said computer disk used by an operating system of a computer system, wherein each area marked as bad is not used by said operating system;
    stalling a critical IO request packet to a critical IO operation, said critical IO request packet identifying an area to be accessed on said computer disk;
    determining whether said area to be accessed on said computer disk corresponds to an area of said computer disk marked as bad;
    evaluating said critical IO request packet as being malicious code upon said determining whether said area to be accessed on said computer disk corresponds to an area of said computer disk marked as bad finding said area to be accessed is marked as bad; and
    performing one of taking protective action, and releasing said critical IO request packet, based on said evaluating.

2. The computer implemented method of claim 1 wherein said evaluating and said performing comprises:
    said taking protective action.

3. The computer implemented method of claim 2 further comprising:
    providing a notification of malicious code detection.

4. The computer implemented method of claim 1 further comprising:
    generating a bad area list, said bad area list including one or more entries, each entry identifying an area of said computer disk marked as bad in a file system of said computer system.

5. The computer implemented method of claim 4 wherein said determining whether said area to be accessed on said computer disk corresponds to an area of said computer disk marked as bad comprises determining whether said area to be accessed on said computer disk corresponds to an entry in said bad area list.

6. The computer implemented method of claim 1 further comprising:
    upon a determination that said area to be accessed on said computer disk does not correspond to said area of said computer disk marked as bad, determining malicious code is not detected on said computer system; and
    releasing said IO request packet to said critical IO operation.

7. The computer implemented method of claim 1 wherein said evaluating comprises determining whether said area to be accessed on said computer disk is successfully accessed; and
upon a determination that said area to be accessed on said computer disk is successfully accessed, said performing takes said protective action.

8. The computer implemented method of claim 1 wherein said evaluating comprises determining whether said area to be accessed on said computer disk is large enough to contain malicious code; and
upon a determination that said area to be accessed on said computer disk is large enough to contain malicious code, said performing takes said protective action.

9. The computer implemented method of claim 1 wherein said evaluating comprises determining whether said area to be accessed on said computer disk contains malicious code; and
upon a determination that said area to be accessed on said computer disk contains malicious code, said performing takes said protective action.

10. The computer implemented method of claim 9 further comprising:
scanning said area to be accessed on said computer disk for malicious code.

11. A computer-program product comprising a computer readable medium containing computer program code comprising:
means for determining areas of a computer disk marked as bad on a computer system, wherein each area marked as bad is not used by an operating system;
means for stalling a critical IO request packet to a critical IO operation, said critical IO request packet identifying an area to be accessed on said computer disk;
means for determining whether said area to be accessed on said computer disk corresponds to an area of said computer disk marked as bad; and
means for taking protective action, when said area to be accessed on said computer disk corresponds to an area of said computer disk marked as bad.

\* \* \* \* \*